（12) United States Patent
Mazabraud et al.

(10) Patent No.: US 7,785,506 B2
(45) Date of Patent: Aug. 31, 2010

(54) METHOD FOR ROTATIONAL MOULDING OF A WORKPIECE COMPRISING A THERMOPLASTIC FOAM LAYER

(75) Inventors: Philippe Mazabraud, Orleans (FR); Gwenael Doulin, La Chapelle-sur-Erdre (FR); Andre Sanchez, Bourg en Bresse (FR); Jean-Francois Cotel, Lyons (FR)

(73) Assignee: Commissariat a l'Energie Atomique, Paris (FR)

( * ) Notice: Subject to any disclaimer, the term of this patent is extended or adjusted under 35 U.S.C. 154(b) by 1222 days.

(21) Appl. No.: 10/527,685

(22) PCT Filed: Sep. 24, 2003

(86) PCT No.: PCT/FR03/02803

§ 371 (c)(1),
(2), (4) Date: Mar. 11, 2005

(87) PCT Pub. No.: WO2004/028773

PCT Pub. Date: Apr. 8, 2004

(65) Prior Publication Data

US 2006/0022365 A1 Feb. 2, 2006

(30) Foreign Application Priority Data

Sep. 27, 2002 (FR) .................................. 02 11994

(51) Int. Cl.
*B32B 9/04* (2006.01)

(52) U.S. Cl. ..................................... 264/45.7; 264/132

(58) Field of Classification Search ................ 264/45.7, 264/132
See application file for complete search history.

(56) References Cited

U.S. PATENT DOCUMENTS

| 3,976,821 | A | * | 8/1976 | Carrow et al. ................ 428/412 |
| 4,836,963 | A | * | 6/1989 | Gilman, Jr. ................. 264/45.7 |
| 6,083,434 | A | * | 7/2000 | Strebel ..................... 264/45.7 |
| 6,261,490 | B1 | * | 7/2001 | Kliene ...................... 264/45.7 |

FOREIGN PATENT DOCUMENTS

| DE | 23 50 763 | 4/1975 |
| EP | 0 160 298 | 11/1985 |
| GB | 2 288 359 | 10/1995 |
| GB | 2288359 A | * 10/1995 |

OTHER PUBLICATIONS

U.S. Appl. No. 12/304,209, filed Dec. 10, 2008, Mazabraud, et al.

* cited by examiner

*Primary Examiner*—Christina Johnson
*Assistant Examiner*—Larry Thrower
(74) *Attorney, Agent, or Firm*—Oblon, Spivak, McClelland, Maier & Neustadt, L.L.P.

(57) ABSTRACT

A foam layer is formed by rotomoulding including heating a foaming polymer, and wherein the heating is interrupted before the foaming temperature is reached. A thermal inertia of the system also composed of the mold and previously placed layers assures completion of heating, but not sufficient to cause disorderly foaming. The foam layer is uniform and bonding. Dense layers surrounding the foam layer may be different.

7 Claims, 2 Drawing Sheets

METHOD FOR ROTATIONAL MOULDING OF A WORKPIECE COMPRISING A THERMOPLASTIC FOAM LAYER

The subject of this invention is a process for rotomoulding parts comprising a layer of thermoplastic foam.

The rotomoulding or rotational moulding technique is often used to make hollow bodies such as drums, kayaks, toys, pots or garbage bins, tanks or road equipment. It consists of depositing a quantity of material to be moulded from which the part will be made in a mould with a cavity corresponding to the outside shape of the part, and this mould is attached to a device for rotation about two axes that is started up such that gravity forces form the part by distributing the material to be moulded around the internal surface of the mould. The mould is then heated to melt the polymer. When heating is switched off, subsequent cooling makes the polymer solidify in the shape of the part. The final steps of the process consist of stopping the movement of the mould and opening it so that the part can be removed.

When the part includes several layers, the process is repeated once for each layer, the quantities of material forming the successive layers being added in the mould after the previous layer has been formed, or they may have been present in the mould at the beginning in thermally insulated boxes which are set to open at the right time to release the contents of the mould.

Structures including a layer of thermoplastic polymer foam are often appreciated to improve insulation, shock resistance or the weight of the part. A polymer can be made to foam by adding an agent to it that decomposes into a gas during heating. However, manufacturing difficulties arise when a rotomoulding process is used since it is difficult to control the degree of foaming and application of the previous processes without special precautions will normally result in a foam layer with an unpredictable and irregular thickness, for which the quality and bond to adjacent layers are also uncertain.

A variant of the process adapted to such materials presented in U.S. Pat. No. 3,976,821 consists of using a special mould with a concavity corresponding to the curved surface of the part, so as to delimit not only the outside surface but also the inside surface of the part. The material of the layer from which the inner skin and the outer skin of the part will be formed is poured alone and is rotated in the same way as in the usual process, it is once again distributed over the internal surface of the mould and the two skins are formed. Formation of the skins is once again achieved by melt followed by solidification, after which the foaming material is added in the mould through an orifice in the skins. Therefore, the foaming material flows into the hollow volume delimited by the skins and occupies it entirely during foaming, since the orifice has been closed off. This guarantees that there will be no shape and thickness irregularities of the foaming layer, but the main disadvantages of this process are that the mould has a more complicated shape and that the skins necessarily have the same thickness and the same composition.

One variant of the process in this case also consists of placing the material from which the skins are made and the foaming material in the mould at the same time, the foaming material being placed in a box or a bag which opens when the skins have been formed. Other processes consist of pouring the two quantities of material (the skin and the foaming material) at the same time in the mould, mixed in the form of powder or pellets. The two categories of polymers are separated due to differences in the size grading, viscosity or melting temperature. But since these processes do not control foaming, it is still necessary to use a mould matching the concavity of the part to be made, and an inner skin and an outer skin with the same thickness and the same composition have to be made.

The invention eliminates these disadvantages and can be used to make parts including at least one first layer made of a compact polymer, surrounding a second layer made of foam and possibly other layers, by a mould that only matches the outside surface of the part. It then becomes possible to make parts containing a completely closed or essentially closed cavity, in other words the concavity has back drafts that would make it impossible to extract a mould matching the surface of the cavity, which was a constraint with the previous processes. Layers and particularly skins, may be of different natures and thicknesses from each other.

It will be seen that the main innovation of the invention is in a particular embodiment of the foam layer formation step, so that it can be controlled. More precisely, in its more general form, it relates to a rotomoulding process for a part comprising at least one first layer made of a compact polymer, and a second layer made of a foam polymer and surrounded on one face by the first layer, including steps for placement of a first quantity of material to make up the first layer in a mould, rotation of the mould to form the first layer by heating of the first quantity of material for polymerisation, and then placement of a second quantity of material making up the second layer in the mould and restarting rotation of the mould, characterised in that heating is interrupted before the second quantity of material reaches its foaming temperature (and frequently but not necessarily after the second quantity of material has exceeded its melting temperature), but the mould is kept rotating until the second quantity of material reaches the foaming temperature and as long as it remains at or above this temperature, thus forming the second layer.

These essential characteristics and others will now be described more completely with reference to the Figures:

FIGS. 1A to 1D describe details of a rotomoulding process,

Figure 1:
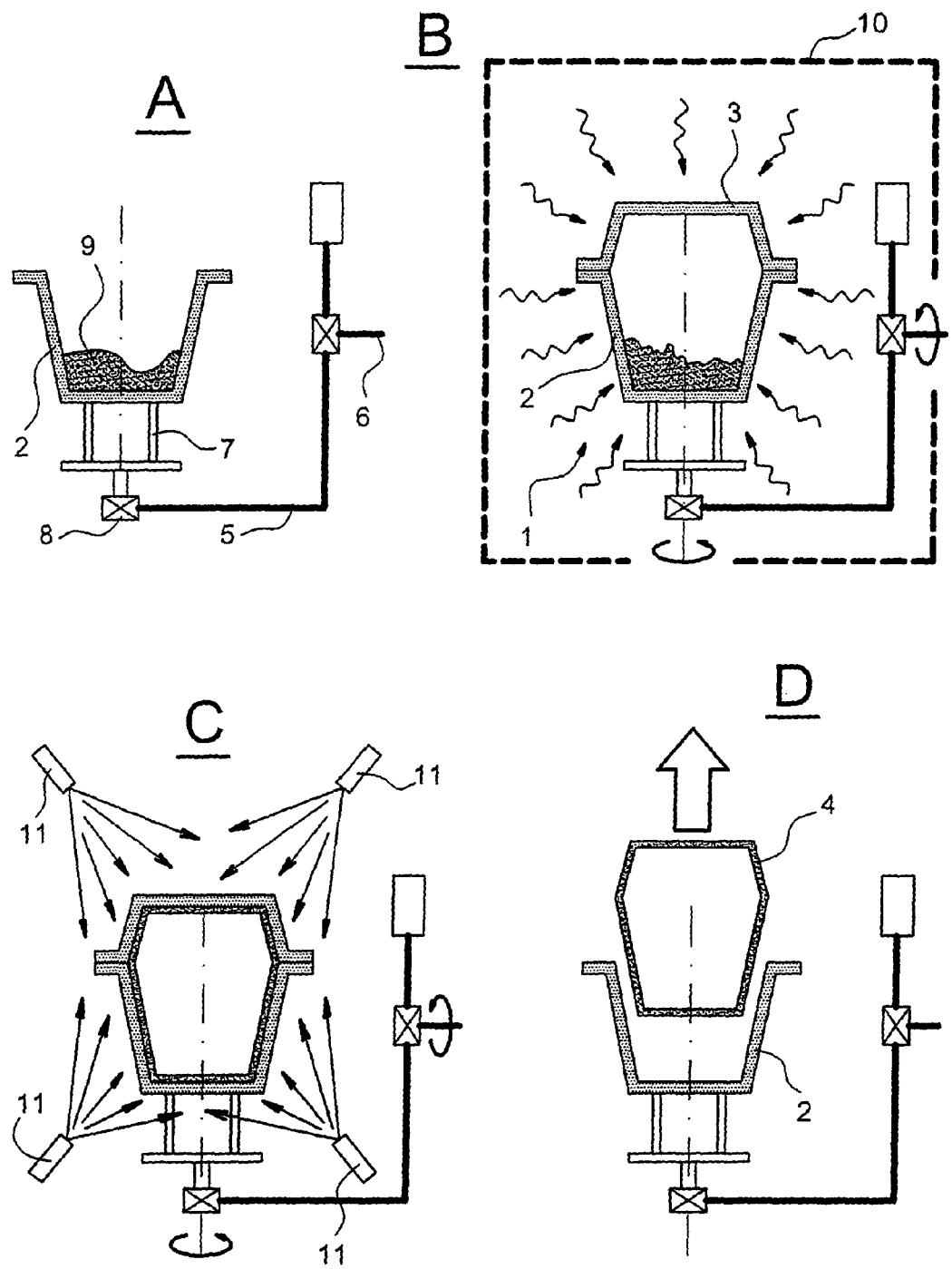

The first FIGS. 1A to 1D firstly illustrate essential steps of an arbitrary rotomoulding process. The part 4 considered here is a hollow double tapered body. It is made in a mould 1 composed of two shells 2 and 3 assembled to a joint plane corresponding to the largest perimeter of the part 4. One of the shells 2 is installed at the end of a bent arm 5 that can be rotated about an axis 6. Furthermore, a support 7 of the shell 2 on the bent arm 5 can rotate about a second axis 8 perpendicular to the first.

The material 9 from which the part 4 will be formed is firstly poured into the shell 2 (A) and the second shell 3 is then assembled to the first, the mould 1 is put into double rotation about the axes 6 and 8 and it is heated by putting it into a furnace 10 or by any other means (B). The material 9 coats all walls of the mould 1 under the effect of gravity forces and melts under the effect of heat. The mould 1 is then allowed to cool or is deliberately cooled by air or liquid jets 11 (C), and when the part 4 has solidified, the shell 3 is detached and the part 4 is extracted (D).

Figure 2:
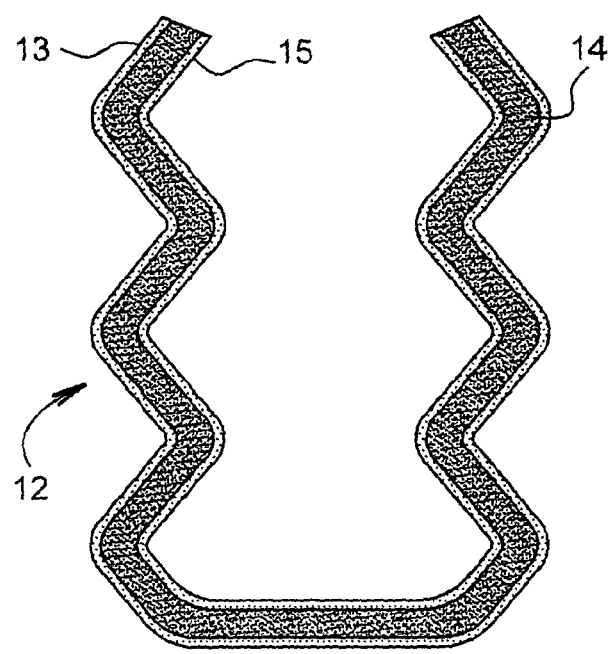
FIG. 2 illustrates a part made using the invention.

We have seen that this process could be repeated to make a part formed of multiple layers. Use of the invention provides a means of extending it to parts including a foam layer, even with a complicated shape like that (12) shown in FIG. 2, in the form of a grooved tank in which annular widenings and narrowings are alternated. The wall is composed of an outer skin 13, an intermediate layer 14 and an inner skin 15. The skins 13 and 15 are compact thermoplastic polymers such as simple or mixed polyolefins, that may or may not be coloured and may or may not have fillers, and are normally added in powder form. The intermediate layer 14 is a foam polymer composed of a thermoplastic matrix that had contained a foaming or blowing agent and possibly a nucleating agent, initially in powder form. This polymer may also be one of the types mentioned above.

Figure 3:
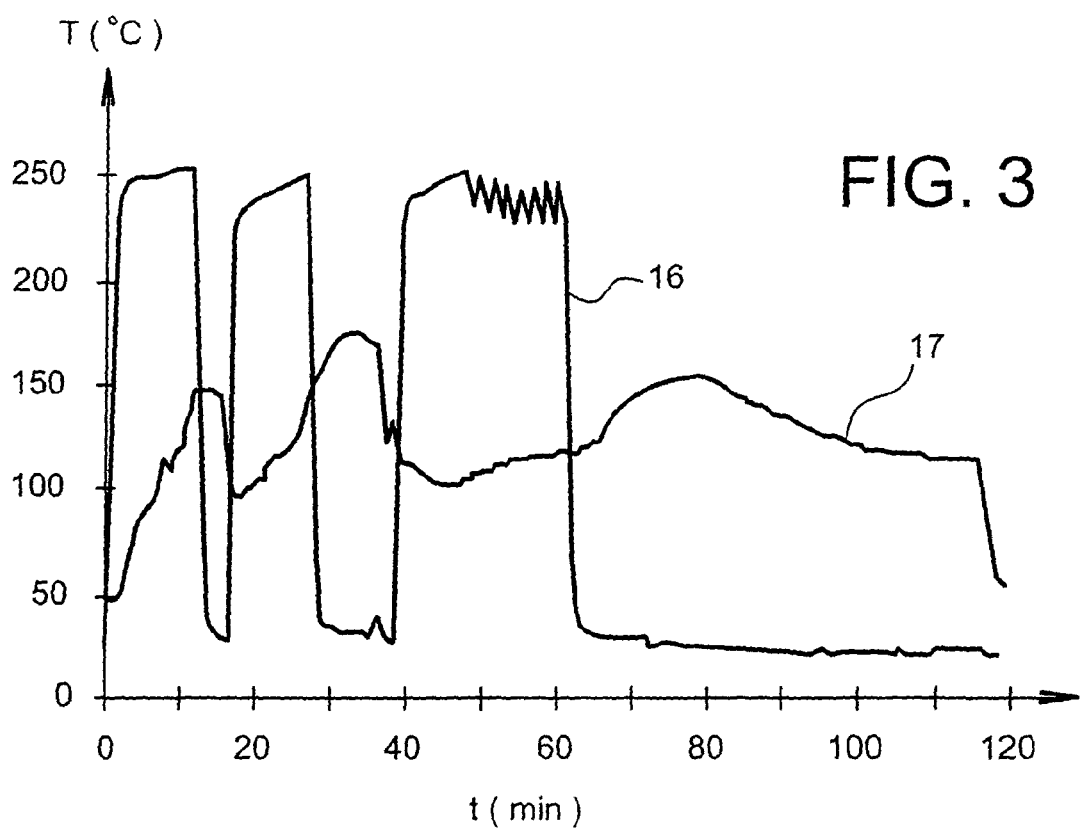
FIG. 3 is a diagram showing the temperature as a function of time.

One particular embodiment of the invention will be described with reference to FIG. 3 that is a temperature diagram in which a curve 16 shows the temperature reached in the furnace 10 around a mould and curve 17 shows the temperature reached in the mould 1 as a function of time. The part considered will be the part 4 that will be made with three layers similar to layers 13, 14 and 15 that have been described.

A quantity of 5 kilograms of polymer (metallocene polyethylene commercial grade RM 8403 made by the BOREALIS Company) is added as a powder in the mould 1, which is put into biaxial rotation at a speed of four revolutions per minute around axis 6 and one rotation per minute around axis 8. The temperature of the furnace 10 is 250° C. When the temperature in the mould reaches 145° C., the mould 1 is removed from the furnace and is opened, and a quantity of 3 kilograms of foaming polymer (grade M 532 polyethylene made by the MATRIX POLYMERS Company) is added as a powder in the mould which is then closed again and rotated again, and put back into the furnace 10, for which the temperature is then fixed to 240° C. When the temperature of the material reaches 150° C., the mould 1 is removed from the furnace 10. However, the mould 1 is left free to rotate outside the furnace until the temperature exceeds the foaming temperature (in this case 170° C.), by thermal inertia. Foaming is left to continue for a time considered to be sufficient and may possibly be interrupted by cooling devices. When the temperature of the material drops below the foaming temperature, rotation of the mould 1 will be stopped and the mould will then be opened and a quantity of 2 kilograms of polymer (metallocene polyethylene commercial grade RM 8343 made by the BOREALIS Company) is added as a powder in the mould 1. The mould is closed again, rotated again, and it is put back into the furnace for which the temperature is fixed at 240° C. When the temperature of the material reaches 120° C., the mould 1 is removed from the furnace 10 and is left free to rotate under natural cooling until the material has reached a temperature sufficiently above its melting temperature by thermal inertia so that the last polymer is suitably moulded. When this moulding temperature is reached, the mould is cooled until the part has solidified. The mould can then be stopped and opened to remove the part 4 from the mould. The thicknesses of the layers 13, 14 and 15 are 5, 8 and 2 millimeters in this case.

The melting temperatures of these three polymers were 132° C., 130° C. and 129° C. respectively. Heating was obviously sufficient so that all melting temperatures were reached and the layers were thus formed. The foaming layer 14 was good quality, uniform and well bonded to the other layers.

The invention claimed is:

1. A process for rotomoulding a part including at least one first layer, made of a compact polymer, and a second layer made of a foam polymer and surrounded on one face by the first layer, the process comprising:

placing a first quantity of material to make up the first layer in a mold;

rotating the mold to form the first layer and heating the first quantity of material to melt the first quantity of material;

then placing a second quantity of material to make up the second layer in the mold and restarting rotation of the mold, wherein the heating is interrupted before the second quantity of material reaches its a foaming temperature for the second quantity of material, but the mold is kept rotating until the second quantity of material reaches the foaming temperature and as long as the second quantity of material remains at or above said foaming temperature, thus forming the second layer.

2. Rotomoulding process according to claim 1, wherein the heating is interrupted as soon as the mold reaches a determined temperature between a melting temperature and the foaming temperature of the second quantity of material.

3. Rotomoulding process according to claim 1, further comprising:

placing a third quantity of material in the mold, to make up a third layer, made of a compact polymer, when the second layer has been formed, and then the mold is rotated again and heated.

4. Rotomoulding process according to claim 3, wherein heating of the mold before placement of the third quantity of material is interrupted before the third quantity of material reaches its melting temperature.

5. Rotomoulding process according to claim 1, applied to a part for which a thickness or chemical nature of layers surrounding the foam layer is different.

6. Rotomoulding process according to claim 1, comprising:

applying heat to the second quantity of material until the second quantity of material reaches a predetermined temperature above a melting temperature for the second quantity of material and below said foaming temperature, rotating said mold during said step of applying heat to the second quantity of material;

interrupting said applying of heat to the second quantity of material when the second quantity of material reaches said predetermined temperature below said foaming temperature;

after interrupting said applying of heat to the second quantity of material, maintaining said rotating of said mold while the second quantity of material continues to heat by thermal inertia and exceeds said foaming temperature such that foaming occurs in the second quantity of material during said rotating, and further maintaining said rotating while the second quantity of material cools from above said foaming temperature to below said foaming temperature; and stopping said rotating after the second quantity of material has cooled below said foaming temperature.

7. Rotomoulding process according to claim 6, wherein said second quantity of material includes a powder of foaming polymer.

* * * * *